United States Patent [19]
Bryant

[11] 3,968,401
[45] July 6, 1976

[54] APPARATUS FOR CONTROLLING THE INTENSITY OF A LIGHT SOURCE

[75] Inventor: Doyle D. Bryant, Granada Hills, Calif.

[73] Assignee: Strand Century Incorporated, Elmwood Park, N.J.

[22] Filed: Nov. 27, 1974

[21] Appl. No.: 527,923

[52] U.S. Cl. ............................ 315/293; 307/222 R; 328/44; 328/48; 315/291
[51] Int. Cl.² ........................................ H05B 41/392
[58] Field of Search ............................ 315/291–307, 315/317–322; 328/44, 48; 307/222 R

[56] References Cited
UNITED STATES PATENTS

| | | | |
|---|---|---|---|
| 3,206,665 | 9/1965 | Burlingham | 328/44 X |
| 3,238,462 | 3/1966 | Ballard et al. | 328/44 X |
| 3,560,859 | 2/1971 | Thompson | 328/44 |
| 3,579,122 | 5/1971 | Paine | 328/44 X |
| 3,706,914 | 12/1972 | Van Buren | 315/292 X |
| 3,763,394 | 10/1973 | Blanchard | 315/294 |

*Primary Examiner*—John Kominski
*Attorney, Agent, or Firm*—Seidel, Gonda & Goldhammer

[57] ABSTRACT

An enabling circuit selectively generates first, second and third enabling signals. The first enabling signal enables a pulse generator means which generates a train of clock pulses. The second enabling signal enables a gating means which applies the clock pulses generated by the pulse generator means to the up input terminal of an up/down counter. The third enabling signal enables a gating means which applies the clock pulses generated by the pulse generator means to the down input terminal of the up/down counter. The up/down counter evaluates the difference between the number of clock pulses applied to its up input terminal and the number of clock pulses applied to its down input terminal and generates a digital signal representative of the evaluation. Finally, digital to analog converter means generates an analog output control signal whose magnitude is determined by the digital generated by the up/down counter.

11 Claims, 5 Drawing Figures

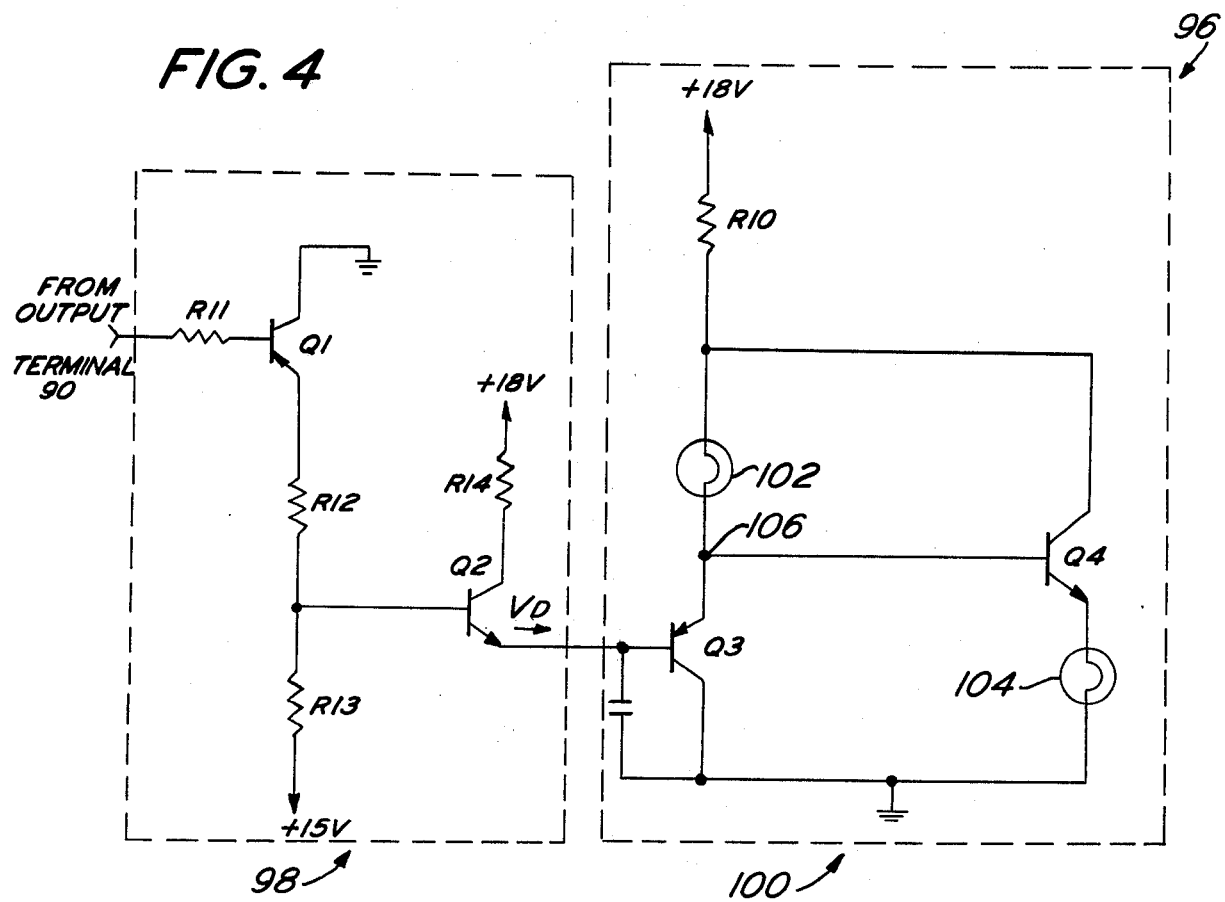

APPARATUS FOR CONTROLLING THE INTENSITY OF A LIGHT SOURCE

BACKGROUND OF THE INVENTION

The present invention is directed towards a control circuit for controlling the intensity of a group of lights. More particularly, the present invention is directed towards a control circuit for selectively raising or lowering the intensity of a group of lights at a desired fade rate. In the preferred embodiment, the present invention can vary the intensity of a group of lights from blackout to peak intensity or from peak intensity to blackout in anywhere between one second and sixty minutes time. While various prior art devices have been designed to accomplish essentially the same result, they usually rely on complex gear systems, to effectuate the timed fade from one intensity level to another. Two obvious disadvantages of such prior art systems are their unreliability due to mechanical failure and their great bulk. Perhaps their most significant limitation, however, lies in the fact the number of discrete fade ratios which can be supplied by such prior art devices is highly restricted. That is, since the motor and gears provide a fixed fade time which can be varied only by mechanically changing the gear ratio, the number of discrete fade rates is restricted to the number of discrete gear ratios provided by each gear box system. As such, the advantage of the present invention resides not merely in its reliability, compactness and quickness of response, but its ability to provide an almost continuous range of fade rates. In addition, the available range of fade rates can be significantly increased by merely providing additional counter circuits to decrease the frequency of the clock pulses generated by the pulse generator.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 4 is a circuit diagram of a mimic circuit used in conjunction with the herein-disclosed invention.

FIG. 5 is a block diagram of the preferred embodiment of the up/down counter and digital to analog converter used in conjunction with the herein-disclosed invention.

DETAILED DESCRIPTION OF THE PREFERRED EMBODIMENTS

Figure 1:
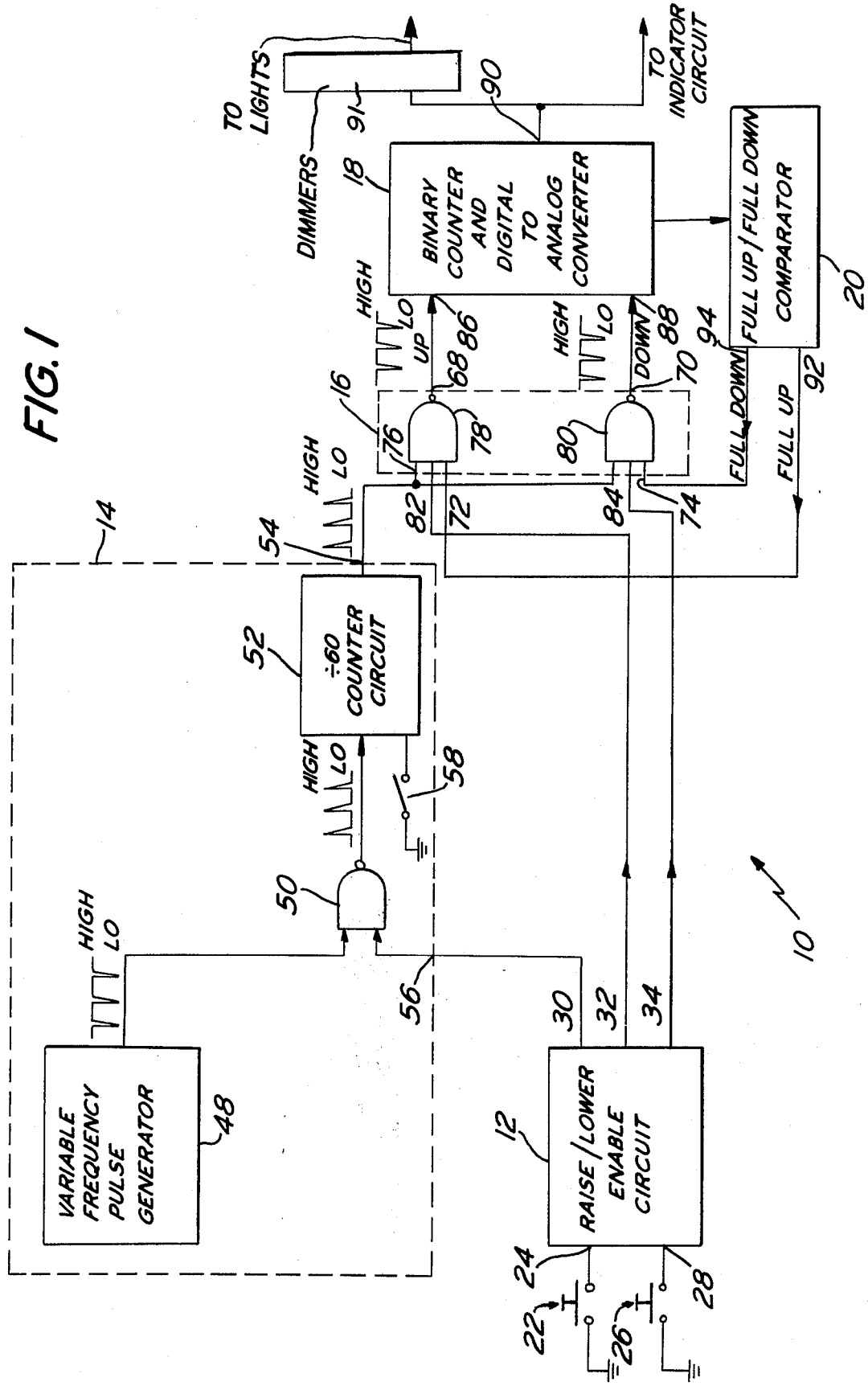
FIG. 1 is a block diagram of the herein-disclosed invention.

Referring to the drawings, wherein like numerals indicate like elements, there is shown in FIG. 1 a block diagram of the herein-disclosed invention, designated generally as 10. Circuit 10 is a control device for raising or lowering the intensity of a group of lights. More specifically, circuit 10 controls the speed at which the intensity of the lights will increase toward peak brightness or decrease toward blackout. Circuit 10 comprises raise/lower enable circuit 12, clock circuit 14, gating logic circuit 16, up/down counter and digital to analog converter 18 and full up/full down comparator 20. Circuit 10 operates in three separate modes; a raise mode, a lower mode and a steady state mode. In the raise mode (wherein the intensity of the lights controlled by circuit 10 is increased), normally open pushbutton switch 22 is depressed, grounding the normally "high" raise enable input 24 of the raise/lower enable circuit 12. In the lower mode (wherein the intensity of the lights controlled by circuit 10 is decreased), normally open pushbutton switch 26 is depressed, grounding the normally "high" lower enable input terminal 28 of raise/lower enable circuit 12. Finally, when operating in the steady state mode (wherein the intensity of the lights controlled by circuit 10 remain at some pre-existing value), neither pushbutton switch 22 nor pushbutton switch 26 are depressed and both input terminals 24 and 28 remain biased "high".

As used herein, a "high" voltage level corresponds to a binary logic state usually designated as 1, and a "low" voltage level corresponds to a binary logic state usually designated as 0. In general, all voltage levels below a specified logic threshold voltage are considered to be "low", and all voltage levels above the threshold voltage are considered to be "high". Consequently, when a voltage signal crosses the logic threshold voltage, there is a transition between the "low" and "high" levels; in other words, there is a transition between binary logic states.

Raise/lower enable circuit 12 is a two input, three output binary device whch produces a particular combination of "high" and "low" level voltage signals at its outputs 30, 32 and 34, depending upon the levels of voltage signals at its inputs 24 and 28. More particularly, raise/lower enable circuit 12 will generate output signals in accordance with the following truth table:

TABLE 1

| | Input Terminals | | Output Terminals | | |
|---|---|---|---|---|---|
| | 24 | 28 | 30 | 32 | 34 |
| Raise mode | low | high | high | high | low |
| Lower mode | high | low | high | low | high |
| Steady state | high | high | low | high | low |

Figure 2:
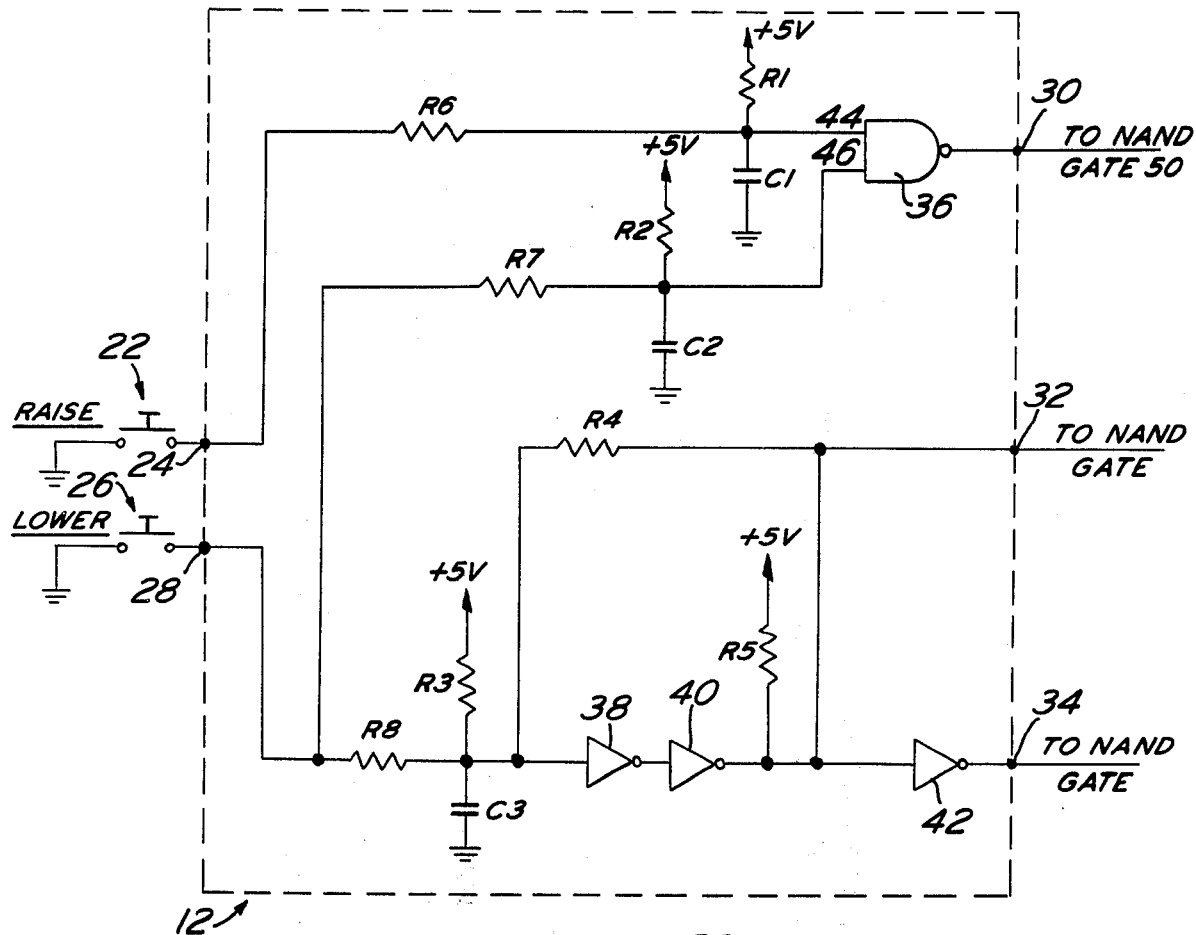
FIG. 2 is a circuit diagram of a raise/lower enable circuit used in conjunction with the herein-disclosed invention.

A circuit which will generate output signals in accordance with the preceding truth table is illustrated in FIG. 2. In accordance with this embodiment, circuit 12 comprises a NAND gate 36 and three inverters 38, 40 and 42. NAND gate 36 is a binary logic device which produces "high" or "low" level output voltage signals depending upon the levels of the voltage signals appearing at its inputs. Specifically, if both inputs are at the "high" level, the NAND gate will generate a "low" level output signal; for all other combinations of input signals, the NAND output will be "high". Inverters 38, 40 and 42 are also binary logic devices which produce a "high" or "low" level output voltage signal depending upon the level of the voltage signal appearing at its input. Specifically, if the input is at the "high" level, the inverter will produce a "low" level output signal; conversely, if the input is at the "low" level, the inverter will produce a "high" level output signal.

As noted above, raise/lower enable circuit 12 must operate in three modes; the raise mode, the lower mode and the steady state mode. When operating in the steady state mode, both pushbutton switches 22 and 26 are open. In this condition, input terminals 24 and 28 will float "high". More particularly, the five volt bias voltage applied to the top of resistors R1 and R2 will charge capacitors C1 and C2, respectively, to the 5 volt level. Since terminals 24 and 28 are both open, they will float at the 5 volt level appearing at the top of capacitors C1 and C2, respectively. The five volts at the top of capacitor C1 and C2 will also be applied to input terminals 44 and 46 of the NAND gate 36 and will cause the output of NAND gate 36 to go "low". As such, a "high" at both input terminals 24 and 28 will produce a "low" at output terminal 30. The "high" at input terminal 28 will also produce a "high" at output terminal 32 and a "low" at output terminal 34. More particularly, since pushbutton switch 26 is open, capacitor C3 will charge to the 5 volt bias voltage applied to the top of resistor R3. This "high" will pass through resistor R4 and appear at output terminal 32. Additionally, the "high" at the top of capacitor C3 will appear at the input of inverter 38. This will produce a "low" at the input of inverter 40 and a "high" at the input of inverter 42. The "high" at the input of inverter 42 is reinforced by the 5 volt bias voltage at the top of resistor R5 and will also reinforce the "high" at output terminal 32. Finally, the "high" at the input of inverter 42 will cause output terminal 34 to go "low". In review, when both pushbutton switches are open, and raise/lower enable circuit 12 is in the steady state mode, output terminal 30, 32 and 34 will be "low", "high" and "low", respectively.

During the raise mode of operation, pushbutton switch 22 is closed and pushbutton switch 26 is open. In this condition, terminal 24 will be grounded and terminal 28 will again float "high". Since terminal 24 is grounded, capacitor C1 will discharge through resistor R6 and input terminal 44 of NAND gate 36 will go "low". Since one of the inputs to NAND gate 36 is "low", its output will go "high" and terminal 30 will also go "high". Since input terminal 28 is still "high", the output terminals 32 and 34 will remain "high" and "low", respectively, as was the case during the steady state mode of operation. In review, when pushbutton switch 22 is closed and pushbutton switch 26 is open, and raise/lower enable circuit 12 is operating in the raise mode, output terminals 30, 32 and 34 will be "high", "high" and "low", respectively.

Finally, in the lower mode of operation, pushbutton switch 22 is open and pushbutton switch 26 is closed. In this condition, terminal 24 will float "high" and terminal "28" will be grounded. Since terminal 24 is floating "high", input terminal 44 to NAND gate 36 will also be "high". However, since terminal 28 is grounded, capacitor C2 will discharge through resistor R7 and input terminal 46 of NAND gate 36 will go "low". The "low" at input terminal 46 will cause the output of NAND gate 36 to go "high". As such, output terminal 30 will also go "high". Since terminal 28 is grounded, capacitor C3 will discharge through resistor R8 and the input to inverter 38 will go "low". This "low" will pass through resistor R4 and appear at output terminal 32. The "low" at the input to inverter 38 will produce a "high" at the input to inverter 40 and a "low" at the input to inverter 42. The "low" at the input to inverter 42 will cause output terminal 34 to go "high". In review, when pushbutton switch 22 is open and pushbutton switch 26 is closed, and raise/lower enable circuit 12 is in the lower mode, outputs 30, 32 and 34 will be "high", "low" and "high", respectively.

As shown below, each set of output signals generated by raise/lower enable circuit 12 will master the remaining elements of circuit 10 and dictate whether circuit 10 operates in the raise, lower or steady state mode. More particularly, raise/lower enable circuit 12 will enable lock circuit 14 during the raise and lower modes and will disable clock circuit 14 during the steady state mode. Additionally, raise/lower enable circuit 12 will enable gating logic circuit 16 to clock the pulses generated by clock circuit 14 into the up input terminal of up/down counter and digital to analog converter 18 during the raise mode and to clock the pulses generated by clock circuit 14 into the down input terminal of up/down counter and digital to analog converter 18 during the lower mode.

Clock circuit 14 comprises variable frequency pulse generator 48, NAND gate 50 and divide by 60 counter circuit 52 and will generate a clock signal at its output terminal 54 whenever an enabling signal is applied to its input terminal 56 by raise/lower enable circuit 12. More particularly, clock circuit 14 will apply a clock signal to gating logic circuit 16 whenever input terminal 30 of raise/lower enable circuit 12 goes "high". Variable speed pulse generator 48 is a conventional pulse generator and is capable of producing a train of negative going pulses, staring "high" and spiking "low" at a frequency determined by an adjustable setting (not shown) associated with the pulse generator. A typical pulse generator of this type utilizes a unijunction transistor with a capacitor connected between its emitter and ground to generate a train of pulses and utilizes a variable constant current source also applied to the emitter of the Unijunction transistor to vary the frequency of the pulse train generated thereby. In the preferred embodiment, pulse generator 48 can generate pulses at any desired frequency between a maximum of 256 pulses per second and a minimum of 4.267 pulses per second. As will be shown below, this permits circuit 10 to raise or lower the intensity of the lights being controlled thereby between blackout and peak brightness in anywhere between 1 second and 60 minutes time.

NAND gate 50 is a binary logic device having the same logic function of NAND gate 36. As such, NAND gate 50 will pass the clock pulses generated by pulse generator 48 whenever output terminal 30 of raise/lower enable circuit 12 is "high". More particularly, whenever output terminal 30 is "high", a train of positive going pulses starting "low" and spiking "high" at a frequency equal to that of the pulse train generated by pulse generator 48 will appear at the output terminal of NAND gate 50.

Divide by 60 counter circuit 52 enables clock circuit 14 to operate in either of two modes; a seconds mode and a minutes mode. In the seconds mode, switch 58 is open and the divide by 60 counter circuit 52 will generate a single positive going clock pulse at its output for each clock pulse applied to its input. When operating in this mode, clock circuit 14 can generate a train of clock pulses having a maximum frequency of 256 pulses per second and a minimum frequency of 4.267 pulses per second. As will be shown below, this will permit circuit 10 to increase or decrease the intensity of the lights controlled thereby between blackout and peak brightness in anywhere between 1 and 60 seconds time. In the minutes mode, switch 58 is closed and divide by 60 counter 52 will generate one clock pulse at its output for every 60 clock pulses applied to its input. When operating in this mode, clock circuit 14 can generate a train of clock pulses having a frequency of anywhere between 4.267 pulses per second and 0.071 pulses per second (or approximately one pulse every 14 seconds). As will be shown below, this will permit circuit 10 to increase or decrease the intensity of the lights controlled thereby between blackout and peak brightness in anywhere between 1 and 60 minutes time.

Figure 3:
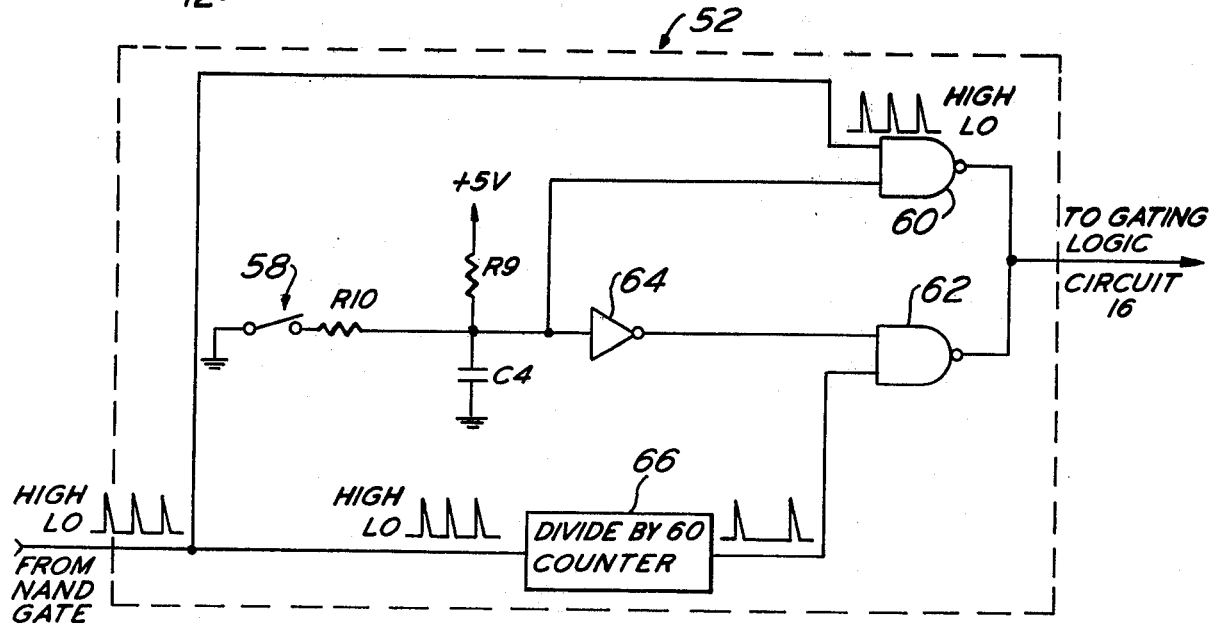
FIG. 3 is a circuit diagram of a divide by 60 counter circuit used in conjunction with the herein-disclosed invention.

The structure of divide by 60 counter circuit 52 is shown in detail in FIG. 3. Divide by 60 counter circuit 52 comprises a pair of NAND gates 60 and 62, an inverter 64 and a divide by 60 counter 66. NAND gates 60 and 62 are binary logic devices whose logic functions are identical to NAND gate 36. Inverter 64 is a binary logic device whose logic function is identical to inverter 38. Divide by 60 counter circuit 66 is a conventional counter which will count the clock pulses applied to its input terminal and will generate one clock pulse at its output terminal for every 60 pulses applied to its input terminal. While the preferred embodiment utilizes a divide by 60 counter, it should be recognized by those skilled in the art that counters which will reduce the frequency of the clock pulses by other factors (e.g., a divide by 30 counter) can also be used without departing from the spirit or scope of the present invention. Whenever switch 58 is open, capacitor C4 will charge up to the five volt bias voltage applied to the top of resistor R9 and "high" will appear at the input of inverter 64. The "high" at the input of inverter 64 will produce a "low" at the top input of NAND gate 62. Since one input to NAND gate 62 is "low", its output will be continuously "high" and it will pass no clock pulses. However, the "high" at the top of capacitor C4 will also be applied to the bottom input terminal of NAND gate 60 and will permit the clock pulses applied to the top input terminal of NAND gate 60 to pass to its output terminal. More particularly, the output of NAND gate 60 will be a negative going pulse train starting "high" and spiking "low" at a frequency equal to the frequency of the pulses generated by the pulse generator 48.

If switch 58 is closed, capacitor C4 will discharge through resistor R10 and the input to NAND gate 64 will go "low". This "low" will also be applied to the bottom terminal of NAND gate 60 and will prevent NAND gate 60 from passing the clock pulses coming from NAND gate 50. However, the "low" at the input terminal of inverter 64 will cause the top input of NAND gate 62 to go "high". This will enable NAND gate 62 to pass the pulse train generated by divide by 60 counter 66. More particularly, the output of NAND gate 62 will be a train of negative going pulses starting "high" and spiking "low" at a frequency equal to one/sixtieth of the frequency of pulse generator 48.

Referring again to FIG. 1, gating logic circuit 16 is a five input, two output device which will apply the clock signal generated by clock circuit 14 to the up input terminal 86 of the up/down counter and digital to analog converter 18 during the raise mode of operation of circuit 10 and to the down input terminal 88 of up/down counter and digital to analog converter 18 during the lower mode of operation. More particularly, gating logic circuitry 16 comprises a pair of NAND gates 78 and 80. One input terminal of each NAND gate 78 and 80 is connected to the clock input terminal 76 of gating logic circuit 16. Clock input terminal 76 is in turn connected to the output terminal 54 of clock circuit 14 and receives the clock signal generated thereby. NAND gate 78 will be enabled and therefore past the clock signal applied to terminal 76 whenever terminals 72 and 82 of gating logic circuitry 16 are "high". Similarly, NAND gate 80 will be enabled and thereby pass the clock signal applied to clock terminal 76 whenever input terminals 74 and 84 of gating logic circuitry 16 are "hight". As will be shown below, input termonas 72 and 74 are normally "high" and do not exert primary control over gating logic circuit 16. As such, they will be presumed to be "high" for the purposes of the present discussion. Since input terminals 72 and 74 are presumed to be "high", the gating function of gating logic circuitry 16 is directly controlled by the condition of input terminals 82 and 84. In particular, when raise/lower enable circuit 12 is in the raise mode, output terminals 30, 32 and 34 will be "high", "high" and "low", respectively. The "high" at output terminal 30 will enable clock circuit 14 which will thereby apply a clock signal to clock input terminal 76 of gating logic circuitry 16. The "high" at output terminal 32 is applied to input terminal 82 and will enable NAND gate 78 and the clock signal applied to terminal 76 will be applied to up input terminal 86. Conversely, the "low" at output terminal 34 is applied to input terminal 84 and will disable NAND gate 80 and no clock signal will be applied to down input terminal 88. In the lower mode of operation, output terminals 30, 32 and 34 are "high", "low" and "high", respectively. The "high" at input terminal 30 will again enable clock circuit 14 which will thereby apply a clock signal to clock input terminal 76 of gating logic circuit 16. The "low" at output terminal 32 is applied to input terminal 82 and will disable NAND gate 78 and no clock signal will be applied to up input terminal 86. Conversely, the "high" at output terminal 34 is applied to input terminal 84 will enable NAND gate 80 and the clock signal applied to clock input terminal 76 will be applied to down input terminal 88. It should also be noted at this time that during the steady state mode of operation of circuit 10, output terminal 30 is "low" and clock circuit 14 will be disabled. As such, no clock signal will be applied to either up input terminal 86 or down input terminal 88 during this mode of operation.

Up/down counter and digital to analog converter 18 evaluates the difference between the number of clock pulses applied to its up input terminal 86 and the number of clock pulses applied to its down input terminal 88 and generates an analog output signal representative of the instantaneous evaluation. In the preferred embodiment (see FIG. 5), up/down counter and digital to analog converter 18 comprises a 256 bit up/down counter 87 and a digital to analog converter 89. The 256 bit up/down counter 87 increases one count for each clock pulse applied to up input terminal 86 and decreases one count for each clock signal applied to down input terminal 88. The up/down counter 87 will also generate a digital signal along lines 91 representative of the instantaneous count. Digital to analog converter 89 is a conventional digital to analog converter and generates an analog output voltage whose magnitude is determined by the value of the digital signal generated by the 256 bit up/down counter 87. More particularly, in the preferred embodiment, the digital to analog converter 89 will generate a minimum output voltage of zero volts D.C. and a maximum output voltage of ten volts D.C. Since up/down counter 87 is a 256 bit counter, it can increase from its minimum to its maximum capacity or from its maximum to its minimum capacity in 256 discrete intervals, each interval representing one additional clock pulse applied to its up input terminal 86 or its down input terminal 88. This means that the analog output voltage generated by digital to analog converter 89 can increase from zero to ten volts D.C. in 256 discrete intervals. More particularly, each pulse applied to up input terminal 86 or down input terminal 88 of 256 bit up/down counter 87 will increase or decrease the analog output voltage at output terminal 90 by approximately 39 millivolts. While the 0 to 10 volt D.C. output voltage of the preferred embodiment has been disclosed by way of example, it should be recognized by those skilled in the art that other minimum or maximum voltage levels could be used without departing from the spirit or scope of the present invention.

The analog output voltage generated at output terminal 90 is applied to a set of dimmers 91 supplying power to the lights whose intensity is being controlled by circuit 10. The dimmers can be any conventional power supply whose power output is controlled by an input control signal. In accordance with the preferred embodiment, the dimmers will supply essentially zero power to the lights when the input signal thereby is at zero volts D.C. and will supply some maximum value of power to the lights when the input signal thereto is 10 volts D.C.

From the above, it can be seen that the speed at which the intensity of the lights controlled by circuit 10 increases or decreases is directly dependent upon the speed at which the clock pulses are applied to up/down counter and digital to analog converter 18. For instance, if the lights are at blackout and clock circuit 14 is set at its maximum frequency (i.e., variable frequency pulse generator 48 is set to generate 256 pulses per second and switch 58 is open), the lights will increase from blackout to peak intensity in one second (the time it takes 256 clock pulses to be applied to up input terminal 86). Similarly, if the lights are at peak brightness and clock circuit 14 is set at its slowest frequency (i.e., variable frequency pulse generator is set at a frequency of 4.267 pulses per second and switch 58 is closed), the intensity of the lights will go from peak brightness to blackout in 60 minutes (the time it takes for 256 pulses to be applied to down input terminal 88).

Full up/full down comparator 20 prevents gating logic circuit 16 from overloading up/down counter and digital to analog converter 18. More particularly, full up/full down comparator 20 will disable NAND gate 78 when up/down counter and digital to analog converter 18 is "full up", and will disable NAND gate 80 when up/down counter and digital to analog converter 18 is "full down". When up/down counter and digital to analog converter 18 is "full up" (i.e., the stored count is at its maximum value of 256), normally "high" output terminal 92 will go "low" and thereby disable NAND gate 78. Similarly, when up/down counter and digital to analog converter 18 is "full down" (i.e., the stored count is zero), normally "high" output terminal 94 will go "low" and disenable NAND gate 80. In other words, full up/full down comparator 20 will prevent gating logic circuit 16 from applying any additional clock pulses to up input terminal 86 of up/down counter and digital to analog converter 18 when up/down counter and digital to analog converter 18 is "full up", and will prevent gating logic circuit 16 from applying any clock signals to down input terminal 88 of up/down counter and digital to analog converter 18 when up/down counter and digital to analog converter 18 is "full down".

In the preferred embodiment, pushbutton switches 22 and 26, switch 58 and the adjustable means associated with variable frequency pulse generator 48 are located on a single control panel (not shown) so that the intensity and fade speeds of the lights may be controlled from one location. Since the control panel may be removed from the area being illuminated by the lights under control of circuit 10, an additional feature of the herein-disclosed invention is a mimic circuit (shown in FIG. 4) which is located on the control panel and which will indicate the relative intensity of the lights being controlled by circuit 10. The mimic circuit 96 (FIG. 4) is conventional and need not be described in great detail. Mimic circuit 96 has two stages; a voltage compressor circuit 98 and an indicator circuit 100. Voltage compressor circuit 98 comprises two transistors Q1 and Q2, biased as shown, and generates a driving voltage $V_D$ whose amplitude is a function of the analog control voltage generated by up/down comparator and digital to analog converter 18. More particularly, in the preferred embodiment, $V_D$ will vary between 2 volts D.C. when the analog control voltage generated by up/down counter and digital to analog converter 18 is at zero volts D.C. and 10 volts D.C. when the analog control voltage generated by up/down counter and digital to analog converter 18 is at 10 volts D.C. The values of resistors E11 through R14 which will generate the desired driving voltage $V_D$ in the preferred embodiment are: R12 = 1K, R12 = 1.816, R13 = 9.1, R14 = 56 ohms. The driving voltage $V_D$ generated by driving circuit 98 is applied to the base of transistor Q3 of indicator circuit 100. Indicator circuit 100 is a conventional push-pull amplifier circuit comprising a PNP transistor Q3 and an NPN transistor Q4. Each transistor Q3 and Q4 will act as an emitter follower applying the voltage at its base to indicator light 102 or 104, respectively. Indicator circuit 100 indicates the relative intensity of the lights being controlled by circuit 10 by varying the intensity of the two indicator lights 102 and 104. More particularly, as the intensity of the lights being controlled by circuit 10 increases, the analog voltage applied to the driving circuit 98 increases. This, in turn, will increase the amplitude of the driving voltage $V_D$ at the base of transistor Q3. Since Q3 transistor is an emitter follower, the voltage at junction 106 will also increase causing the voltage across indicator lamp 102 to decrease and the intensity of indicator lamp 102 to drop. Since transistor Q4 is also an emitter follower, the increased voltage level at junction 106 causing the voltage across indicator lamp 104 to increase and the intensity of indicator lamp 104 to rise. The resultant increase in the intensity of indicator light 104 and the decrease in the intensity of indicator light 102 indicates that the intensity of the group of lights being controlled by circuit 10 has increased. Conversely, if the intensity of the lights being controlled by circuit 10 decreases, this will cause $V_D$ to decrease, the voltage drop across indicator light 102 to increase and the voltage drop across indicator light 104 to decrease. The resultant decrease in the intensity of indicator lamp 102 and the increase in the intensity of indicator lamp 104 will indicate that the intensity of the lights controlled by circuit 10 has decreased.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for generating a control signal for controlling the intensity of a light source, comprising:
    an enabling circuit for selectively generating first, second and third enabling signals;
    pulse generator means electrically connected to said enabling circuit for generating a train of clock pulses in response to said first enabling signal;
    up/down counter means having an up input terminal and a down input terminal;
    gating means for applying said clock pulses to said up input terminal in response to said second enabling signal and for applying said clock pulses to said down input terminal in response to said third enabling signal, said gating means electrically connected to said pulse generator means and said enabling circuit;
    said up/down counter means for evaluating the difference between the number of said clock pulses applied to said up input terminal and the number of said clock pulses applied to said down input terminal and for generating a digital signal representing said evaluation;
    digital to analog converter means for converting said digital signal to an analog control signal.

2. Apparatus in accordance with claim 1, wherein said pulse generator means includes means for controlling the frequency of said pulses.

3. Apparatus in accordance with claim 2, wherein said pulse generator means comprises:
    a variable frequency pulse generator for generating a train of clock pulses;
    second gating means for gating said clock pulses generated by said variable frequency pulse generator in response to said first enabling signal.

4. Apparatus in accordance with claim 3, including counter means electrically connected to said second gating means for reducing the frequency of said gated clock pulses by some predetermined value.

5. Apparatus in accordance with claim 1, wherein said up/down counter means is a 256 bit counter.

6. Apparatus in accordance with claim 1, including an indicating means responsive to said analog control signal for indicating the relative intensity of the light source being controlled by said apparatus.

7. Apparatus in accordance with claim 1, including feedback means for preventing said gating means for applying said clock pulses to said up input terminal when said up/down counter means is full up and for preventing said gating means from applying said clock pulses to said down input terminal when said up/down counter means is full down.

8. Apparatus in accordance with claim 1, wherein said enabling circuit generates said first and said second enabling signals when said apparatus is to raise the intensity of the light source whose intensity is being controlled thereby, and wherein said enabling circuit generates said first and said third enabling signals when said apparatus is to lower the intensity of the light source whose intensity is being controlled thereby.

9. Apparatus in accordance with claim 1, wherein said gating means comprises:
    a first gate whose inputs are connected to said train of clock pulses and said second enabling signal and whose output is connected to said up input terminal; and
    a second gate whose inputs are connected to said train of clock pulses and said third enabling signal and whose output is connected to said down input terminal.

10. Apparatus in accordance with claim 8 including feedback means for disabling said first gate when said up/down counter is full up and for disabling said second gate when said up/down counter is full down.

11. Apparatus in accordance with claim 1 including a dimmer means responsive to said analog control signal for supplying an amount of power determined by the magnitude of said analog control signal to a light source.

* * * * *